(12) United States Patent
Hoshiba et al.

(10) Patent No.: US 7,520,352 B2
(45) Date of Patent: Apr. 21, 2009

(54) ELECTRIC VEHICLE AND CONTROL METHOD OF THE SAME

(75) Inventors: Takeshi Hoshiba, Toyota (JP); Masaya Amano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 201 days.

(21) Appl. No.: 10/585,669

(22) PCT Filed: Jul. 27, 2005

(86) PCT No.: PCT/JP2005/014148

§ 371 (c)(1),
(2), (4) Date: Jul. 7, 2006

(87) PCT Pub. No.: WO2006/022125

PCT Pub. Date: Mar. 2, 2006

(65) Prior Publication Data

US 2008/0053721 A1    Mar. 6, 2008

(30) Foreign Application Priority Data

Aug. 25, 2004  (JP)  ............................. 2004-244763
Mar. 16, 2005  (JP)  ............................. 2005-074874

(51) Int. Cl.
*B60W 20/00*  (2006.01)
(52) U.S. Cl. ............................. 180/65.29; 180/65.285
(58) Field of Classification Search ............... 180/65.2, 180/65.3, 65.4, 65.8; 903/942, 943, 948
See application file for complete search history.

(56) References Cited

U.S. PATENT DOCUMENTS 4,293,281 A * 10/1981 Lamoreaux .................... 417/9

(Continued)

FOREIGN PATENT DOCUMENTS

CA    2 253 691 C    6/1999

(Continued)

OTHER PUBLICATIONS

Tatsuo Teratani et al., "Development of Toyota Mild Hybrid System (THS-M) with 42V PowerNet," Electric Machines and Drives Conference, 2003, IEMDC'03. IEEE International Jun. 1-4, 2003, Piscataway, NJ, USA, IEEE, vol. 1, Jun. 1, 2003, pp. 3-10.

*Primary Examiner*—Jeffrey J Restifo
(74) *Attorney, Agent, or Firm*—Oliff & Berridge, PLC

(57) ABSTRACT

In response to a decrease in observed battery voltage Vb to or below a preset threshold value Vs1, the control procedure of the invention closes the gates of an inverter for an air conditioner to stop a supply of electric power to the air conditioner (at a time point t1). In response to a further decrease in observed battery voltage Vb to or below a preset threshold value Vm1, the control procedure closes the gates of inverters for motors MG1 and MG2 to stop supplies of electric power to the motors MG1 and MG2 (at a time point t2). The threshold values Vs1 and Vm1 are set to keep the battery voltage Vb at or above a minimum required voltage for proper operations of an electric power steering (EPS). This arrangement guarantees the minimum required voltage for proper operations of the EPS and accordingly ensures the stable steering performance even in the event of a voltage decrease of the battery.

12 Claims, 7 Drawing Sheets

U.S. PATENT DOCUMENTS

| | | | | |
|---|---|---|---|---|
| 5,166,584 | A * | 11/1992 | Fukino et al. | 318/139 |
| 5,345,761 | A * | 9/1994 | King et al. | 60/274 |
| 5,473,228 | A * | 12/1995 | Nii | 318/158 |
| 5,635,805 | A * | 6/1997 | Ibaraki et al. | 318/139 |
| 5,986,416 | A | 11/1999 | Dubois | |
| 6,048,288 | A | 4/2000 | Tsujii et al. | |
| 6,073,456 | A * | 6/2000 | Kawai et al. | 62/133 |
| 6,318,487 | B2 * | 11/2001 | Yanase et al. | 180/65.2 |
| 6,367,577 | B2 | 4/2002 | Murata et al. | |
| 6,452,286 | B1 * | 9/2002 | Kubo et al. | 290/40 C |
| 6,516,621 | B2 * | 2/2003 | Homan et al. | 62/133 |
| 6,624,529 | B2 * | 9/2003 | Obayashi | 290/40 C |
| 6,651,759 | B1 * | 11/2003 | Gruenwald et al. | 180/65.2 |
| 6,662,580 | B2 * | 12/2003 | Suitou et al. | 62/228.1 |
| 6,782,704 | B2 * | 8/2004 | Kuroda et al. | 62/133 |
| 6,837,215 | B2 * | 1/2005 | Nishigaki et al. | 123/352 |
| 6,840,055 | B2 * | 1/2005 | Iritani | 62/230 |
| 6,874,330 | B2 * | 4/2005 | Iritani | 62/236 |
| 6,987,369 | B1 * | 1/2006 | Franks, II | 318/153 |
| 7,258,183 | B2 * | 8/2007 | Leonardi et al. | 180/65.1 |
| 2001/0010261 | A1 * | 8/2001 | Oomura et al. | 165/42 |
| 2001/0020833 | A1 * | 9/2001 | Yanase et al. | 318/139 |
| 2001/0052760 | A1 * | 12/2001 | Amano et al. | 320/163 |
| 2002/0057582 | A1 * | 5/2002 | Nakayama et al. | 363/17 |
| 2002/0084769 | A1 * | 7/2002 | Iritani et al. | 320/104 |
| 2004/0168454 | A1 * | 9/2004 | Iritani | 62/230 |

FOREIGN PATENT DOCUMENTS

| | | |
|---|---|---|
| DE | 196 17 548 A1 | 11/1997 |
| DE | 199 47 922 A1 | 4/2001 |
| DE | 101 17 059 A1 | 10/2001 |
| DE | 103 50 056 A1 | 5/2004 |
| EP | 0 916 546 A2 | 5/1999 |
| JP | A 63-284063 | 11/1988 |
| JP | U 64-1171 | 1/1989 |
| JP | B2 2735208 | 1/1998 |
| JP | A 11-208492 | 8/1999 |
| JP | A 2000-329628 | 11/2000 |
| JP | A 2003-112539 | 4/2003 |
| JP | A 2003-252228 | 9/2003 |

* cited by examiner

ELECTRIC VEHICLE AND CONTROL METHOD OF THE SAME

DESCRIPTION

Electric Vehicle and Control Method of the Same

TECHNICAL FIELD

The present invention relates to an electric vehicle and a control method of the electric vehicle. More specifically the invention pertains to an electric vehicle that is driven with output power of a motor, as well as to a control method of such an electric vehicle.

BACKGROUND ART

One proposed electric vehicle runs with output power of a drive motor that is driven with a supply of electric power from a battery, and has a power steering that is actuated with output power of a power steering motor (see, for example, Japanese Utility Model Laid-Open Gazette No. 64-1171). This proposed electric vehicle stops the supply of electric power to the drive motor in the event of an abnormal voltage decrease of the battery, while stopping the supply of electric power to the power steering motor after elapse of a preset time period corresponding to a coasting time. This prevents overdischarge of the battery and the inoperative power steering during a coasting drive.

DISCLOSURE OF THE INVENTION

The prior art electric vehicle stops the supply of electric power to the power steering motor after elapse of the preset time period since the stop of the power supply to the drive motor. When the electric vehicle still continues driving after elapse of the preset time period, however, this stop control may undesirably cause the inoperative power steering and lead to a resulting abrupt increase in required steering force. In the event of a voltage decrease of the battery, for example, due to acceleration of the electric vehicle, the stop of the power supply to the drive motor interferes with output of the required driving force and thus causes the poor driving feeling.

The electric vehicle of the invention and the control method of the electric vehicle thus aim to ensure stable steering performance even in the event of a voltage decrease of a battery. The electric vehicle of the invention and the control method of the electric vehicle also aim to keep the good driving feeling even in the event of a voltage decrease of the battery. The electric vehicle of the invention and the control method of the electric vehicle further aim to prevent overdischarge of the battery.

At least part of the above and the other related objects are attained by the electric vehicle and the control method of the electric vehicle having the configurations and arrangements discussed below.

The present invention is directed to an electric vehicle that is driven with output power of a motor, and includes: an accumulator unit that transmits electric power to and from the motor; an auxiliary machine that is actuated with a supply of electric power from the accumulator unit; a steering assist structure that is driven with a supply of electric power from the accumulator unit and outputs a steering torque to a steering mechanism; a voltage measurement module that measures a voltage of the accumulator unit; and a control module that, when the voltage measured by the voltage measurement module decreases to or below a preset first level, stops the supplies of electric power from the accumulator unit to the auxiliary machine and to the motor.

The electric vehicle of the invention stops the supplies of electric power to the auxiliary machine and to the motor, when the measured voltage of the accumulator unit decreases to or below the preset first level. This arrangement guarantees the supply of required electric power to the steering assist structure and ensures the stable steering performance even in the event of a voltage decrease of the accumulator unit. One typical example of the 'auxiliary machine' is an air conditioner.

In the electric vehicle of the invention, it is preferable that the preset first level is higher than a minimum drive voltage required for proper operation of the steering assist structure. The supplies of electric power to the auxiliary machine and to the motor are stopped when the measured voltage of the accumulator unit decreases to or below the preset first level, which is higher than the minimum drive voltage required for proper operation of the steering assist structure. This arrangement effectively guarantees the minimum drive voltage required for proper operation of the steering assist structure.

In one preferable embodiment of the electric vehicle of the invention, in response to a decrease in measured voltage to or below the preset first level, the control module stops the supply of electric power to the auxiliary machine prior to the stop of the supply of electric power to the motor. The stop of the power supply to the auxiliary machine prior to the stop of the power supply to the motor guarantees the supply of required electric power to the motor and thereby keeps the good driving feeling. In this embodiment, the control module may stop the supply of electric power to the auxiliary machine in response to the decrease in measured voltage to or below the preset first level, while stopping the supply of electric power to the motor in response to a further decrease in measured voltage to or below a preset second level that is lower than the preset first level.

In another preferable embodiment of the electric vehicle of the invention, the control module stops the supply of electric power from the accumulator unit to the steering assist structure when the measured voltage decreases to a preset third level that is lower than the preset first level. The supply of electric power to the steering assist structure is stopped in response to a decrease in measured voltage of the accumulator unit to the preset third level. This arrangement effectively prevents overdischarge of the accumulator unit. In this embodiment, in response to the decrease in measured voltage to the preset third level, the control module may gradually decrease the steering torque output from the steering assist structure to the steering mechanism, prior to the stop of the supply of electric power to the steering assist structure. This arrangement desirably prevents momentary heavy steering at a stop of the power supply to the steering assist structure. It is also preferable that the control module implements the gradual decrease in steering torque in a predetermined time period, prior to the stop of the supply of electric power to the steering assist structure.

In still another preferable embodiment, the electric vehicle of the invention includes an internal combustion engine; and an electric power-mechanical power input output structure that is connected to an output shaft of the internal combustion engine and to a drive shaft linked with an axle of the electric vehicle and outputs at least part of output power of the internal combustion engine to the drive shaft through input and output of electric power and mechanical power, and the motor is connected with the drive shaft to input and output power from and to the drive shaft. In this embodiment, the electric power-mechanical power input output structure may include: a three shaft-type power input output mechanism that is linked to three shafts, that is, the output shaft of the internal combustion engine, the drive shaft, and a third rotating shaft, and automatically determines power input from and output to a residual one shaft based on powers input from and output to any two shafts among the three shafts; and a generator that inputs and outputs power from and to the third rotating shaft, and the control module may stop a supply of electric power to the generator accompanied with the stop of the supply of electric power to the motor.

The present invention is directed to a control method of an electric vehicle that is driven with output power of a motor and includes: the motor; an accumulator unit that transmits electric power to and from the motor; an auxiliary machine that is actuated with a supply of electric power from the accumulator unit; and a steering assist structure that is driven with a supply of electric power from the accumulator unit and outputs a steering torque to a steering mechanism, and the control method includes the steps of: (a) measuring a voltage of the accumulator unit; and (b) when the voltage of the accumulator unit measured in the step (a) decreases to or below a preset first level, stopping the supplies of electric power from the accumulator unit to the auxiliary machine and to the motor.

The control method of the electric vehicle of the invention stops the supplies of electric power to the auxiliary machine and to the motor, when the measured voltage of the accumulator unit decreases to or below the preset first level. This arrangement guarantees the supply of required electric power to the steering assist structure and ensures the stable steering performance even in the event of a voltage decrease of the accumulator unit. One typical example of the 'auxiliary machine' is an air conditioner.

In one preferable embodiment of the control method of the electric vehicle of the invention, in response to a decrease in measured voltage to or below the preset first level, the step (b) stops the supply of electric power to the auxiliary machine prior to the stop of the supply of electric power to the motor. The stop of the power supply to the auxiliary machine prior to the stop of the power supply to the motor guarantees the supply of required electric power to the motor and thereby keeps the good driving feeling. In this embodiment, the step (b) may stop the supply of electric power to the auxiliary machine in response to the decrease in measured voltage to or below the preset first level, while stopping the supply of electric power to the motor in response to a further decrease in measured voltage to or below a preset second level that is lower than the preset first level.

In another preferable embodiment, the control method of the electric vehicle includes the step of: in response to the decrease in measured voltage to the preset third level that is lower than the preset first level, gradually decreasing the steering torque output from the steering assist structure to the steering mechanism, prior to the stop of the supply of electric power to the steering assist structure. This arrangement desirably prevents momentary heavy steering at a stop of the power supply to the steering assist structure.

BEST MODES OF CARRYING OUT THE INVENTION

Figure 1:
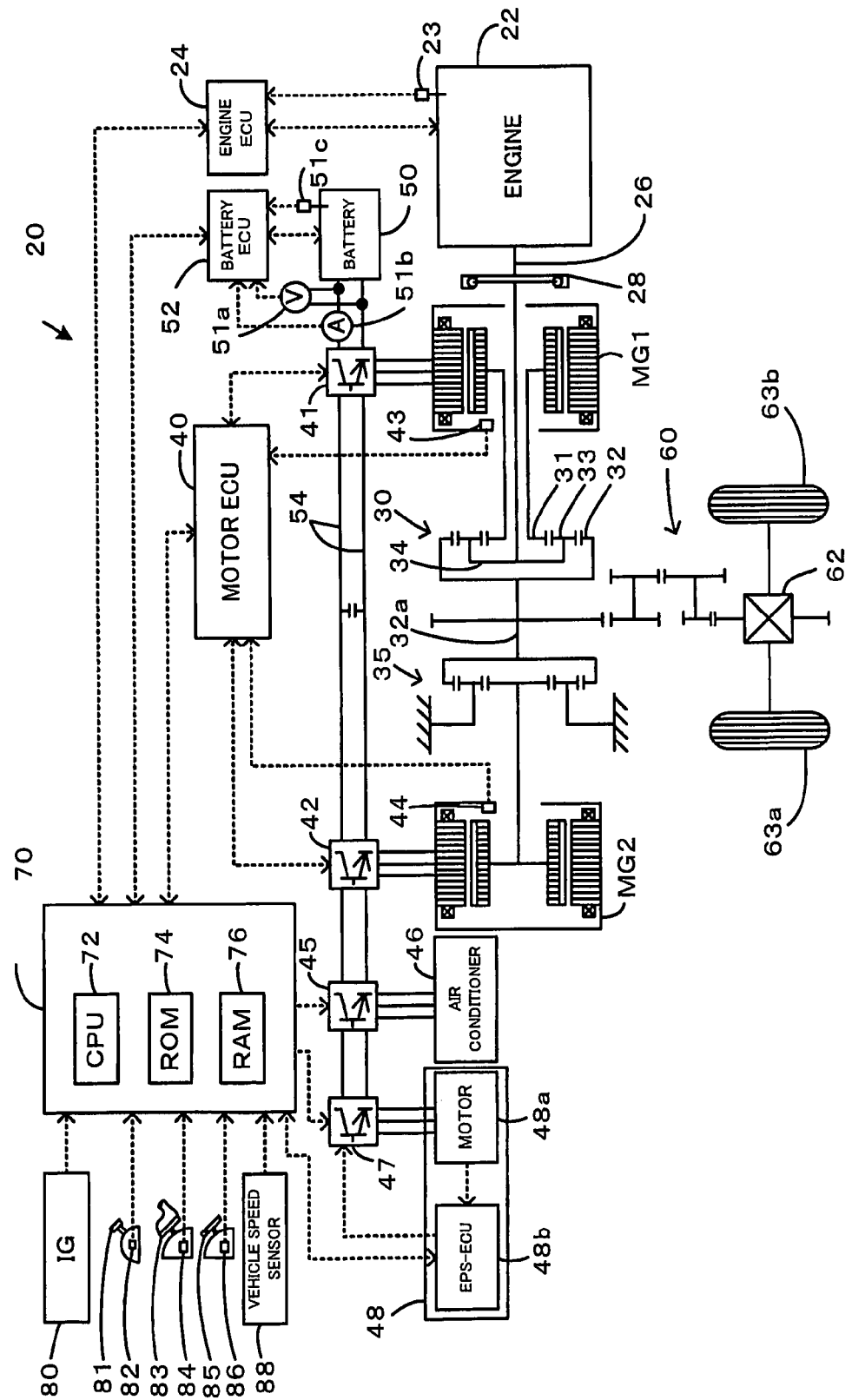
FIG. 1 schematically illustrates the configuration of a hybrid vehicle functioning as an electric vehicle in one embodiment of the invention.

One mode of carrying out the invention is discussed below as a preferred embodiment. FIG. 1 schematically illustrates the configuration of a hybrid vehicle 20 functioning as an electric vehicle in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from a temperature sensor 23 that detects a cooling water temperature Te of engine 22 and other diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The power line 54 is connected to an air conditioner 46 via an inverter 45 and to an electric power steering (hereafter referred to as EPS) 48 via an inverter 47. The EPS 48 outputs an assist torque to a steering mechanism (not shown) by the cooperative functions of an internal motor 48a and reduction gears (not shown). The supply of electric power from the battery 50 is used to actuate a compressor (not shown) of the air conditioner 46 and the motor 48a of the EPS 48. An EPS electronic control unit (hereafter referred to as EPS-ECU) 48b built in the EPS 48 controls the motor 48a to output an assist torque corresponding to the steering angle.

The battery 50 is under control of a battery electronic control unit (hereafter referred to as battery ECU) 52. The battery ECU 52 receives diverse signals required for control of the battery 50, for example, an inter-terminal voltage Vb measured by a voltage sensor 51a disposed between terminals of the battery 50, a charge-discharge current Ib measured by a current sensor 51b attached to the power line 54 connected with the output terminal of the battery 50, and a battery temperature Tb measured by a temperature sensor 51c attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. said motor.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
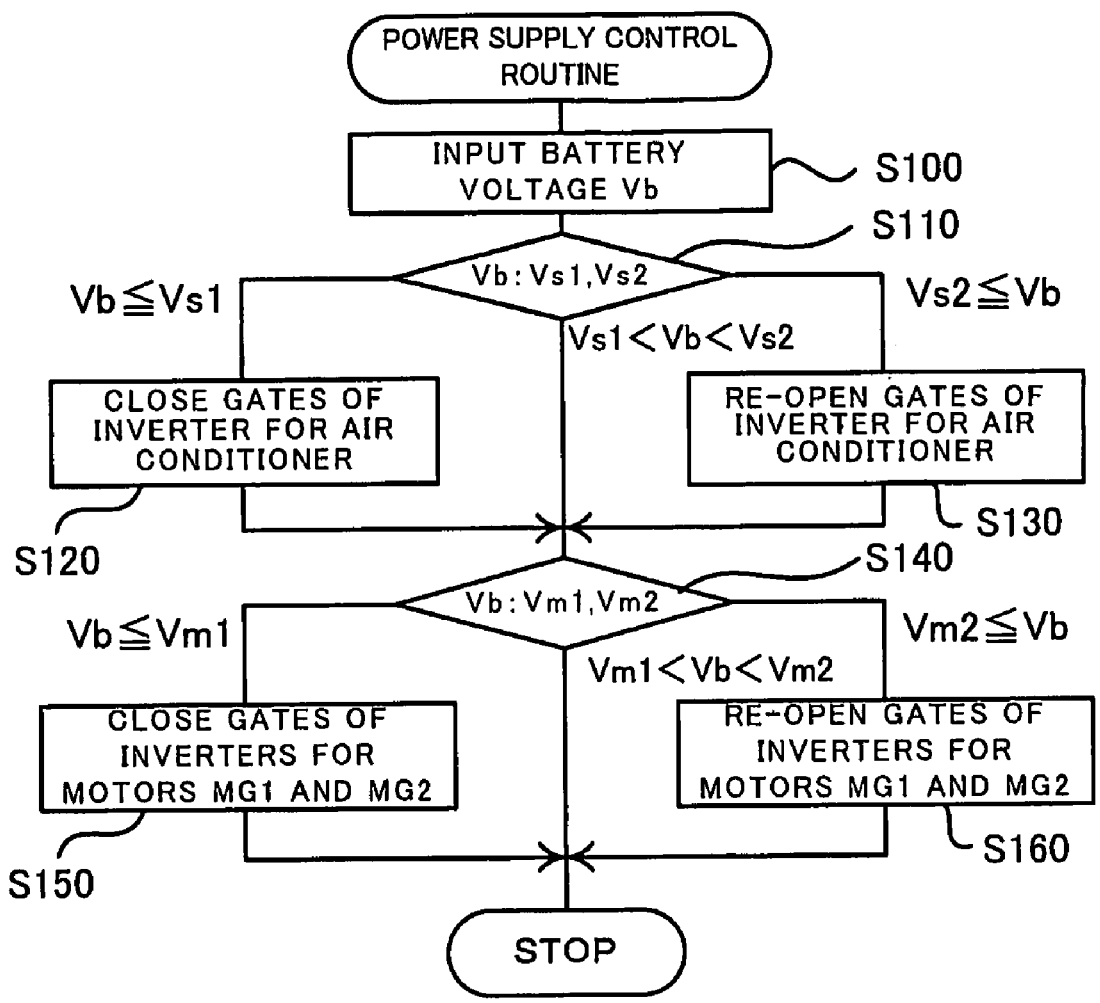
FIG. 2 is a flowchart showing a power supply control routine executed by a hybrid electronic control unit included in the hybrid vehicle of the embodiment.

The description now regards the operations of the hybrid vehicle 20 of the embodiment having the configuration discussed above, especially a series of control in response to a decrease in inter-terminal voltage Vb of the battery 50. FIG. 2 is a flowchart showing a power supply control routine executed by the hybrid electronic control unit 70 included in the hybrid vehicle 20 of the embodiment. This routine is carried out repeatedly at preset time intervals (for example, at every 8 msec).

In the power supply control routine, the CPU 72 of the hybrid electronic control unit 70 first inputs the inter-terminal voltage Vb of the battery 50 (step S100). The inter-terminal voltage Vb of the battery 50 is measured by the voltage sensor 51a and is received from the battery ECU 52 by communication. In the description below, the inter-terminal voltage Vb of the battery 50 may be referred to as the battery voltage Vb.

The input battery voltage Vb is compared with preset threshold values Vs1 and Vs2 (step S110). When the battery voltage Vb is not higher than the preset threshold value Vs1, the CPU 72 closes the gates of the inverter 45 for the air conditioner 46 (step S120). When the battery voltage Vb is not lower than the preset threshold value Vs2, the CPU 72 reopens the gates of the inverter 45 for the air conditioner 46 (step S130). The threshold values Vs1 and Vs2 are set to have a certain hysteresis for prevention of frequent changeovers between closure and re-open of the gates of the inverter 45. The threshold values Vs1 and Vs2 are higher than the minimum required voltage for proper operations of the EPS 48.

The input battery voltage Vb is subsequently compared with preset threshold values Vm1 and Vm2 (step S140). When the battery voltage Vb is not higher than the preset threshold value Vm1, the CPU 72 closes the gates of the inverters 41 and 42 for the motors MG1 and MG2 (step S150). When the battery voltage Vb is not lower than the preset threshold value Vm2, the CPU 72 reopens the gates of the inverters 41 and 42 for the motors MG1 and MG2 (step S160). After the processing of either step S150 or step S160, the CPU 72 exits from this power supply control routine. The threshold values Vm1 and Vm2 are set to have a certain hysteresis for prevention of frequent changeovers between closure and re-open of the gates of the inverters 41 and 42, like the preset threshold values Vs1 and Vs2. The threshold values Vm1 and Vm2 are lower than the preset threshold values Vs1 and Vs2 but higher than the minimum required voltage for proper operations of the EPS 48.

Figure 3:
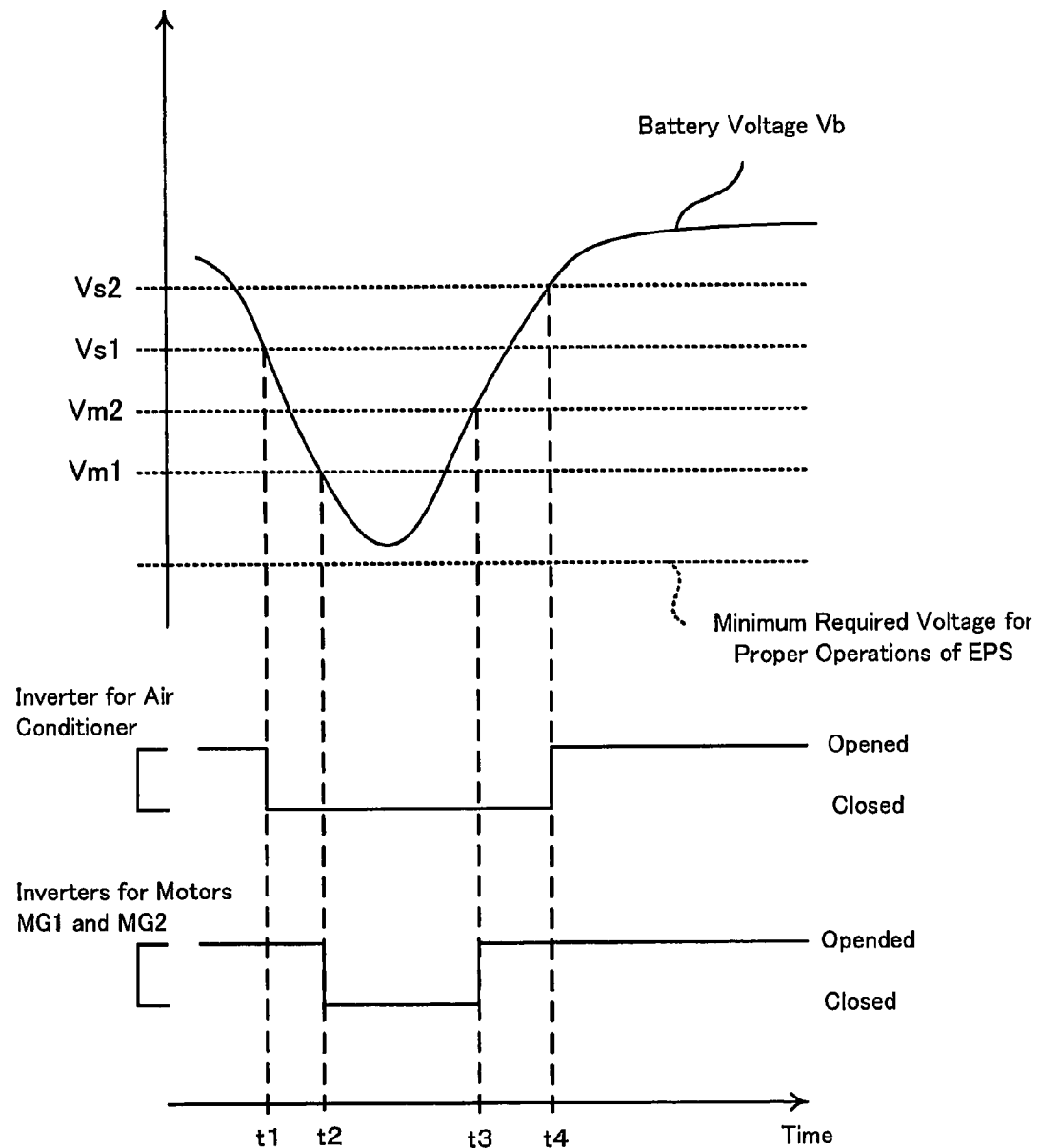
FIG. 3 shows time-series gate operations of inverters for an air conditioner and for motors MG1 and MG2 in response to a decrease in inter-terminal voltage Vb of a battery.

FIG. 3 shows time-series gate operations of the inverter 45 for the air conditioner 46 and the inverters 41 and 42 for the motors MG1 and MG2 in response to a decrease in inter-terminal voltage Vb of the battery 50. When the observed inter-terminal voltage Vb of the battery 50 decreases to or below the preset threshold value Vs1, the gates of the inverters 45 for the air conditioner 46 are closed to stop the supply of electric power to the air conditioner 46 (at a time point t1). In response to a further decrease in battery voltage Vb to or below the preset threshold value Vm1, the gates of the inverters 41 and 42 for the motors MG1 and MG2 are closed to stop the supplies of electric power to the motors MG1 and MG2 (at a time point t2). The shutdown of the gates reduces the power consumption of the air conditioner 46 and the motors MG1 and MG2 and eventually makes an upward turn of the inter-terminal voltage Vb of the battery 50. When the increased battery voltage vb reaches or exceeds the preset threshold value Vm2, the gates of the inverters 41 and 42 for the motors MG1 and MG2 are re-opened to resume the supplies of electric power to the motors MG1 and MG2 (at a time point t3). In response to a further increase in battery voltage Vb to or above the preset threshold value Vs2, the gates of the inverter 45 for the air conditioner 46 are re-opened to resume the supply of electric power to the air conditioner 46 (at a time point t4). In this manner, the supplies of electric power to the air conditioner 46 and to the motors MG1 and MG2 are stopped in response to a decrease in inter-terminal voltage Vb of the battery 50, so as to guarantee the supply of required electric power to the EPS 48. The threshold values Vs1 and Vm1 are used as the criteria for stopping the supplies of electric power to the air conditioner 46 and to the motors MG1 and MG2. These threshold values Vs1 and Vm1 are set experimentally or otherwise to keep the inter-terminal voltage Vb of the battery 50 at or above the minimum required voltage for proper operations of the EPS 48.

As described above, in response to a decrease in observed inter-terminal voltage Vb of the battery 50 to or below the preset threshold value Vs1, the hybrid vehicle 20 of the embodiment closes the gates of the inverter 45 to stop the supply of electric power to the air conditioner 46. In response to a further decrease in inter-terminal voltage Vb of the battery 50 to or below the preset threshold value Vm1, the hybrid vehicle 20 of the embodiment closes the gates of the inverters 41 and 42 to stop the supplies of electric power to the motors MG1 and MG2. The threshold values Vs1 and Vm1 are set experimentally or otherwise to keep the inter-terminal voltage Vb of the battery 50 at or above the minimum required voltage for proper operations of the EPS 48. This arrangement guarantees the minimum required voltage for proper operations of the EPS 48 and accordingly ensures the stable steering performance even in the event of a voltage decrease of the battery 50. The supplies of electric power to the motors MG1 and MG2 are stopped after the stop of the supply of electric power to the air conditioner 46. This arrangement gives priority to the motors MG1 and MG2 over the air conditioner 46 and accordingly keeps the good driving feeling.

The motor MG1, the motor MG2, the battery 50, the air conditioner 46, the EPS 48, and the voltage sensor 51a included in the hybrid vehicle 20 of the embodiment respectively correspond to the generator, the motor, the accumulator unit, the auxiliary machine, the steering assist structure, and the voltage measurement module of the invention. The hybrid electronic control unit 70 executing the power supply control routine of this embodiment corresponds to the control module of the invention. The preset threshold values Vs1 and Vm1 of the embodiment are respectively equivalent to the preset first level and the preset second level of the invention.

In the hybrid vehicle 20 of the embodiment, the threshold values Vs1 and Vm1 as the criteria for stopping the supplies of electric power to the air conditioner 46 and to the motors MG1 and MG2 are set experimentally or otherwise to keep the inter-terminal voltage Vb of the battery 50 at or above the minimum required voltage for proper operations of the EPS 48. The inter-terminal voltage Vb of the battery 50 may not be strictly kept over the minimum required voltage for proper operations of the EPS 48 but may be slightly lower than the minimum required voltage.

In the hybrid vehicle 20 of the embodiment, in response to a decrease in inter-terminal voltage Vb of the battery 50 to or below the preset threshold value Vm1, the gates of the inverters 41 and 42 are closed to stop the supplies of electric power to the motors MG1 and MG2. The comparison between the battery voltage Vb and the threshold value Vm1 is, however, not essential. The general requirement is to stop the supply of electric power to the air conditioner 46, prior to the stop of the supplies of electric power to the motors MG1 and MG2. One possible modification may close the gates of the inverters 41 and 42 to stop the supplies of electric power to the motors MG1 and MG2 after elapse of a predetermined time period since the timing of closing the gates of the inverter 45 to stop the supply of electric power to the air conditioner 46. When some sacrifice of the driving feeling is ignorable, the power supply to the air conditioner 46 may not be stopped prior to the stop of the power supplies to the motors MG1 and MG2. The stop of the power supplies to the motors MG1 and MG2 may be implemented simultaneously with or even prior to the stop of the power supply to the air conditioner 46.

The above embodiment regards the stop of the power supply to the air conditioner 46 in the hybrid vehicle 20. The technique of the invention is also applicable to stop the power supply to any auxiliary machine (for example, an electric stabilizer) other than the air conditioner 46 in the hybrid vehicle 20, as well as to stop the power supplies to any multiple auxiliary machines in the hybrid vehicle 20.

The hybrid vehicle 20 of the embodiment stops the supply of electric power to the air conditioner 46 in response to a decrease in inter-terminal voltage Vb of the battery 50 to or below the preset threshold value Vs1 and subsequently stops the supplies of electric power to the motors MG1 and MG2 in response to a further decrease in battery voltage Vb to or below the preset threshold value Vm1. One modified control procedure may additionally close the gates of the inverter 47 and stop the supply of electric power to the EPS 48 when the battery voltage Vb decreases below a preset threshold value Ve that is lower than the preset threshold value Vm1 and may be equal to or slightly higher than the minimum required voltage for proper operations of the EPS 48. In this case, the preferable procedure gradually decreases the assist torque output from the EPS 48 to the steering mechanism before closing the gates of the inverter 47 to stop the supply of electric power to the EPS 48. One modified routine of such power supply control is shown in the flowchart of FIG. 4, and a routine of corresponding EPS control executed by the EPS-ECU 48b is shown in the flowchart of FIG. 5.

Figure 4:
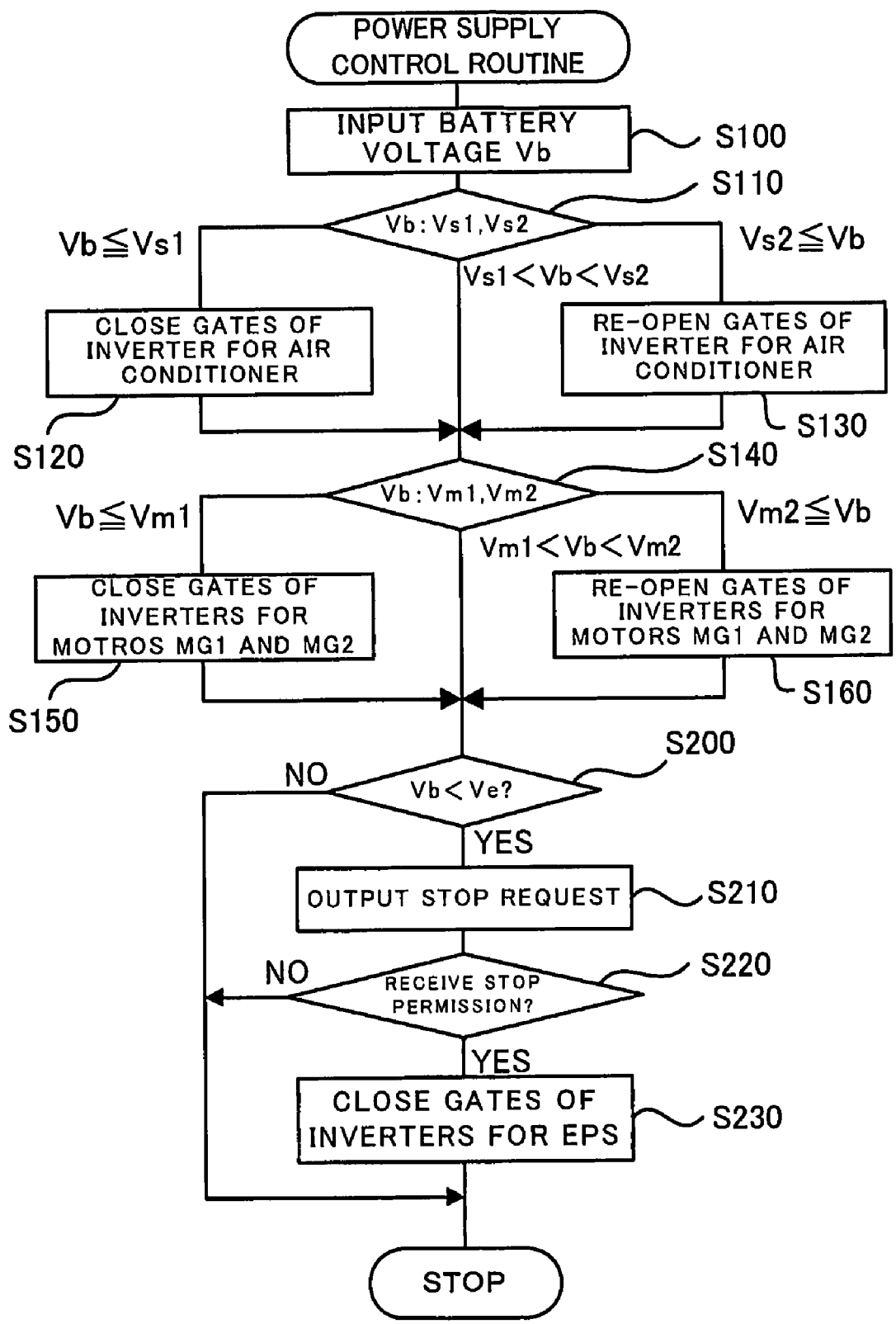
FIG. 4 is a flowchart showing a modified power supply control routine.

The modified power supply control routine of FIG. 4 has steps S100 to S160 identical with the corresponding steps in the power supply control routine of the embodiment shown in FIG. 2. In the modified power supply control routine of FIG. 4, after the processing of steps S140 to S160, the measured inter-terminal voltage Vb of the battery 50 is further compared with the preset threshold value Ve that is lower than the preset threshold values Vs1 and Vm1 (step S200). When the inter-terminal voltage Vb of the battery 50 decreases below the preset threshold value Ve, the. CPU 72 outputs a stop request to the EPS-ECU 48b (step S210). In response to reception of a stop permission sent back from the EPS-ECU 48b (step S220), the CPU 72 closes the gates of the inverter 47 for the EPS 48 (step S230).

Figure 5:
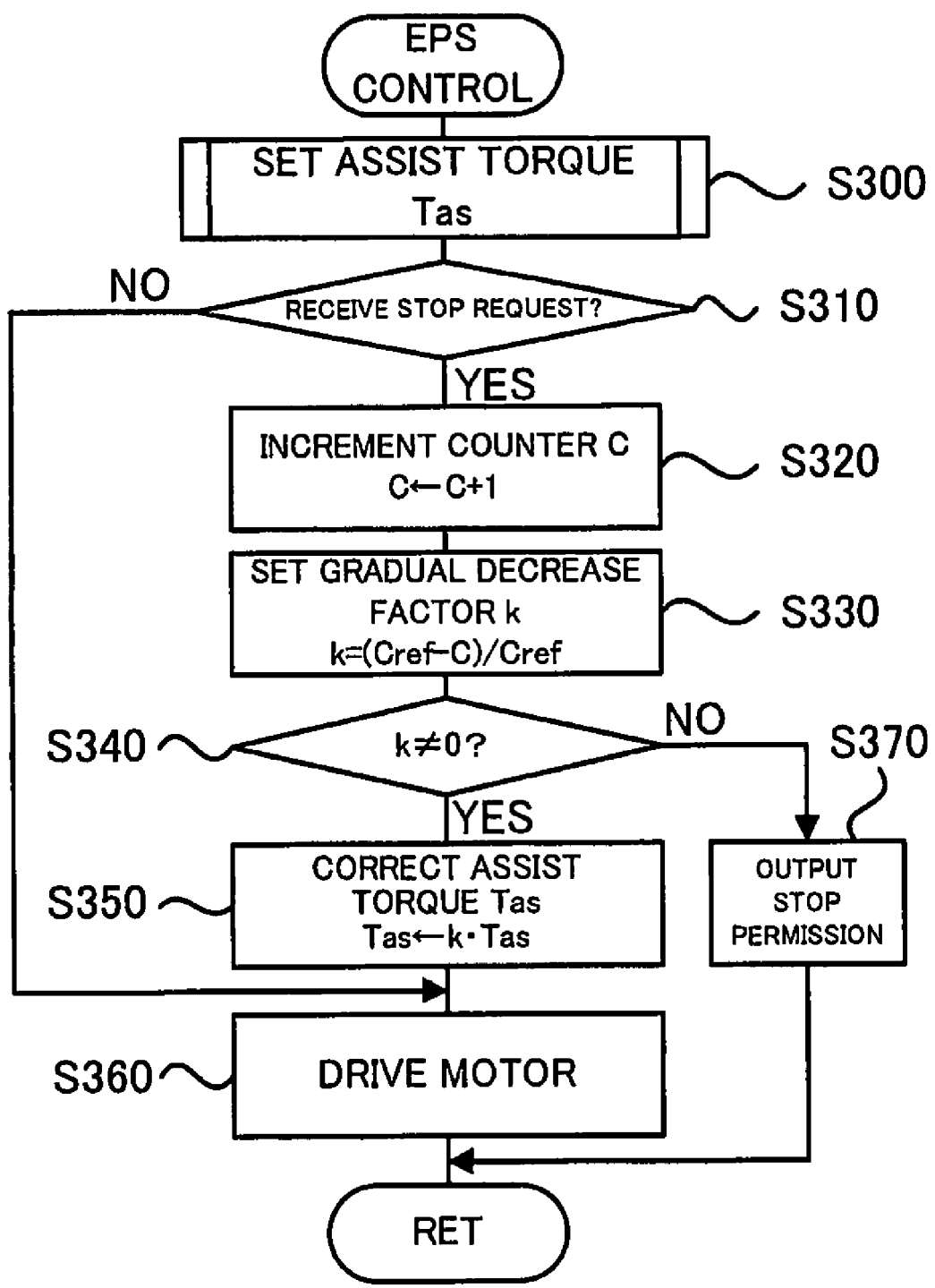
FIG. 5 is a flowchart showing an electric power steering (EPS) control routine executed by an EPS electronic control unit.

In the EPS control routine of FIG. 5, the EPS-ECU 48b first sets an assist torque Tas corresponding to the steering angle (step S300) and determines whether a stop request is received from the hybrid electronic control unit 70 (step S310). In the case of no reception of a stop request, the EPS-ECU 48b drives the motor 48a to output the assist torque Tas (step S360) and terminates the EPS control routine. In response to reception of a stop request from the hybrid electronic control unit 70, on the other hand, the EPS-ECU 48b increments a counter C by one (step S320). The counter C has an initial value '0' and is incremented to a preset reference value Cref. The EPS-ECU 48b sets a gradual decrease factor k, which gradually decreases from the value '1' to the value '0' corresponding to the count on the counter C to the preset reference value Cref (step S330). The assist torque Tas is continually corrected by multiplication of the gradual decrease factor k (step S350) until the gradual decrease factor k reaches the value 0' (step S340). The EPS-ECU 48b then drives the motor 48a to output the corrected assist torque Tas (step S360) and terminates the EPS control routine. When the gradual decrease factor k reaches the value 0', the EPS-ECU 48b outputs a stop permission to the hybrid electronic control unit 70 (step S370). The time required for the decrease of the gradual decrease factor k to the value '0' depends upon the preset reference value Cref and the execution interval of the EPS control. The reference value Cref is set to make the gradual decrease factor k reach the value '0' in a time period of, for example, approximately 2 seconds.

When the inter-terminal voltage Vb of the battery 50 decreases below the preset threshold value Ve, the power supply control routine of FIG. 4 and the EPS control routine of FIG. 5 are executed to gradually decrease the assist torque Tas of the EPS 48 in the time period of approximately 2 seconds. When the decreased assist torque Tas reaches the value 0', the gates of the inverter 47 are closed to stop the supply of electric power to the motor 48a of the EPS 48. The modified control gradually decreases the assist torque Tas of the EPS 48, prior to the stop of the power supply to the motor 48a of the EPS 48 in response to a decrease in inter-terminal voltage Vb of the battery 50 during a drive of the hybrid vehicle 20. This arrangement desirably prevents momentary heavy steering. The modified control procedure sets the gradual decrease factor k to gradually decrease the assist torque Tas of the EPS 48. A further modification may not set the gradual decrease factor k but may directly implement a gradual decrease of the assist torque Tas.

Figure 6:
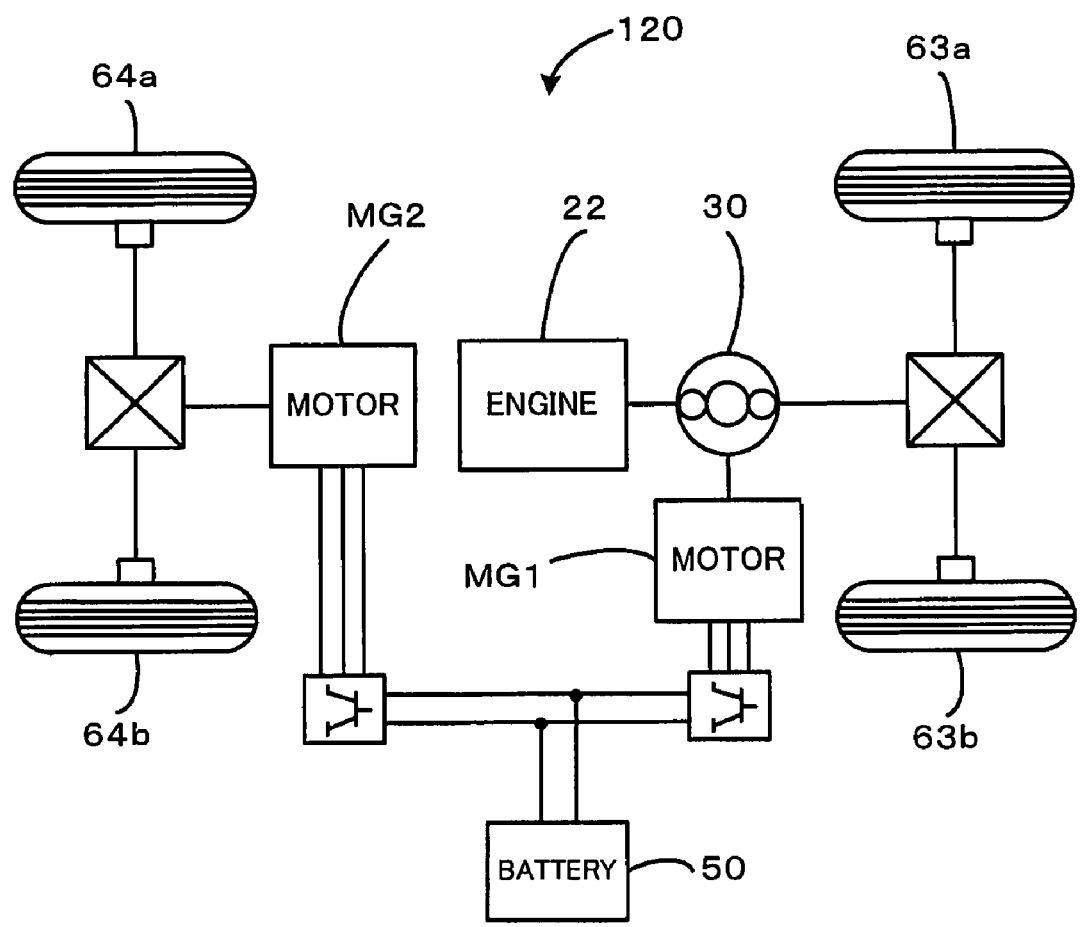
FIG. 6 schematically illustrates the configuration of another hybrid vehicle in one modified example.
Figure 7:
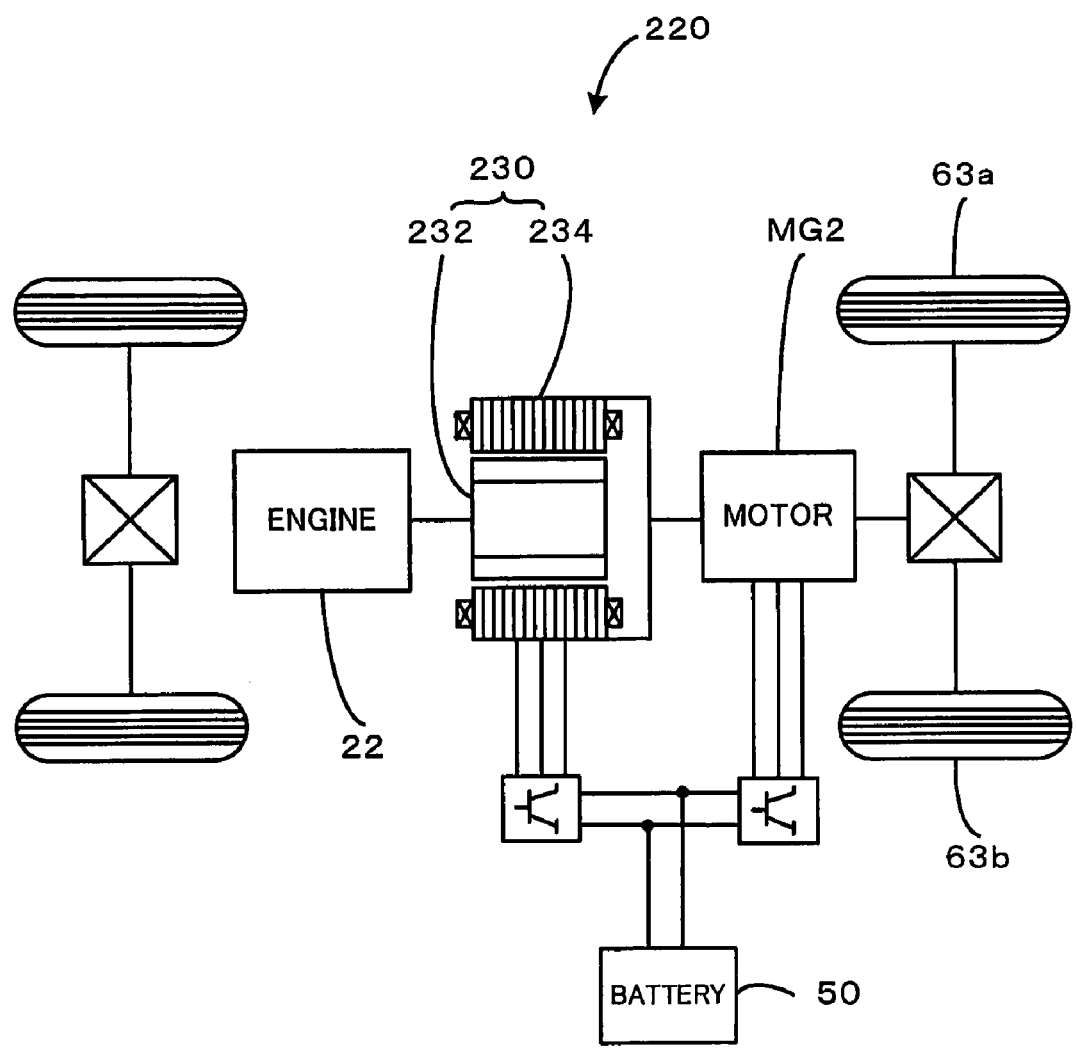
FIG. 7 schematically illustrates the configuration of still another hybrid vehicle in another modified example.

In the hybrid vehicle 20 of the embodiment described above, the engine 22 and the motors MG1 and MG2 are linked to the planetary gear mechanism. The technique of the invention is applicable to electric vehicles of any configurations that are driven with output power of the motor. For example, the technique of the invention may be applied to a hybrid vehicle 120 of one modified structure shown in FIG. 6. In the hybrid vehicle 120 of this modified configuration, the power of the motor MG2 is connected to a different axle (an axle linked to drive wheels 64a and 64b) from the axle connected with the ring gear shaft 32a (that is, the axle linked to the drive wheels 63a and 63b). In another example, the technique of the invention may also be applied to a hybrid vehicle 220 of another modified structure shown in FIG. 7. The hybrid vehicle 220 of this modified configuration includes a pair-rotor motor 230 that includes an inner rotor 232 connected to the crankshaft 26 of the engine 22 and an outer rotor 234 connected to the drive shaft to output power to the drive wheels 63a and 63b. The pair-rotor motor 230 transmits part of the output power of the engine 22 to the drive shaft, while converting a residual of the output power into electric power. The technique of the invention is not restricted to such parallel hybrid vehicles, but is also applicable to series hybrid vehicles as well as to electric vehicles that do not have an engine and are driven with only the output power of a motor.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to manufacturing industries of electric vehicles.

The invention claimed is:

1. An electric vehicle that is driven with output power of a motor, said electric vehicle comprising:
   an accumulator unit that transmits electric power to and from the motor;
   an auxiliary machine that is actuated with a supply of electric power from the accumulator unit;
   a steering assist structure that is driven with a supply of electric power from the accumulator unit and outputs a steering torque to a steering mechanism;
   a voltage measurement module that measures a voltage of the accumulator unit; and
   a control module that, when the voltage measured by said voltage measurement module decreases to or below a preset first level, stops the supplies of electric power from the accumulator unit to the auxiliary machine and to motor,
   wherein said control module stops the supply of electric power from the accumulator unit to the steering assist structure when the measured voltage decreases to a preset other level that is lower than the preset first level.

2. An electric vehicle in accordance with claim 1, wherein the preset first level is higher than a minimum drive voltage required for proper operation of the steering assist structure.

3. An electric vehicle in accordance with claim 1, wherein said control module, in response to a decrease in measured voltage to or below the preset first level, stops the supply of electric power to the auxiliary machine prior to the stop of the supply of electric power to the motor.

4. An electric vehicle in accordance with claim 3, wherein said control module stops the supply of electric power to the auxiliary machine in response to the decrease in measured voltage to or below the preset first level, and stops the supply of electric power to the motor in response to a further decrease in measured voltage to or below a preset second level that is lower than the preset first level.

5. An electric vehicle in accordance with claim 1, wherein said control module, in response to the decrease in measured voltage to the preset other level, gradually decreases the steering torque output from the steering assist structure to the steering mechanism, prior to the stop of the supply of electric power to the steering assist structure.

6. An electric vehicle in accordance with claim 5, wherein said control module implements the gradual decrease in steering torque in a predetermined time period, prior to the stop of the supply of electric power to the steering assist structure.

7. An electric vehicle in accordance with claim 1, wherein the auxiliary machine is an air conditioner.

8. An electric vehicle in accordance with claim 1, said electric vehicle further comprising:

an internal combustion engine; and an electric power-mechanical power input output structure that is connected to an output shaft of the internal combustion engine and to a drive shaft linked with an axle of said electric vehicle and outputs at least part of output power of the internal combustion engine to the drive shaft through input and output of electric power and mechanical power, wherein the motor is connected with the drive shaft to input and output power from and to the drive shaft.

9. An electric vehicle in accordance with claim 8, wherein, the electric power-mechanical power input output structure comprises: a three shaft-type power input output mechanism that is linked to three shafts, that is, the output shaft of the internal combustion engine, the drive shaft, and a third rotating shaft, and automatically determines power input from and output to a residual one shaft based on powers input from and output to any two shafts among the three shafts; and a generator that inputs and outputs power from and to the third rotating shaft, and said control module stops a supply of electric power to the generator accompanied with the stop of the supply of electric power to the motor.

10. A control method of an electric vehicle that is driven with output power of a motor, said electric vehicle comprising: the motor; an accumulator unit that transmits electric power to and from the motor; an auxiliary machine that is actuated with a supply of electric power from the accumulator unit; and a steering assist structure that is driven with a supply of electric power from the accumulator unit and outputs a steering torque to a steering mechanism, said control method comprising the steps of:

(a) measuring a voltage of the accumulator unit;

(b) stopping the supplies of electric power from the accumulator unit to the auxiliary machine and to the motor when the voltage of the accumulator unit measured in said step (a) decreases to or below a preset first level; and (c) gradually decreasing, in response to the decrease in measured voltage to a preset other level that is lower than the preset first level, the steering torque output from the steering assist structure to the steering mechanism, prior to the stop of the supply of electric power to the steering assist structure.

11. A control method of an electric vehicle in accordance with claim 10, wherein said step (b), in response to a decrease in measured voltage to or below the preset first level, stops the supply of electric power to the auxiliary machine prior to the stop of the supply of electric power to the motor.

12. A control method of an electric vehicle in accordance with claim 11, wherein said step (b) stops the supply of electric power to the auxiliary machine in response to the decrease in measured voltage to or below the preset first level, and stops the supply of electric power to the motor in response to a further decrease in measured voltage to or below a preset second level that is lower than the preset first level.

* * * * *